(12) United States Patent
Li (10) Patent No.: US 11,022,850 B2
(45) Date of Patent: Jun. 1, 2021

(54) LIQUID CRYSTAL PANEL (71) Applicant: SHENZHEN CHINA STAR OPTOELECTRONICS SEMICONDUCTOR DISPLAY TECHNOLOGY CO., LTD., Guangdong (CN)

(72) Inventor: Wenying Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 327 days.

(21) Appl. No.: 16/314,481

(22) PCT Filed: Sep. 14, 2018

(86) PCT No.: PCT/CN2018/105782
§ 371 (c)(1),
(2) Date: Dec. 31, 2018

(87) PCT Pub. No.: WO2020/015121
PCT Pub. Date: Jan. 23, 2020

(65) Prior Publication Data
US 2020/0363686 A1 Nov. 19, 2020

(30) Foreign Application Priority Data
Jul. 18, 2018 (CN) .......................... 201810788169.6

(51) Int. Cl.
G02F 1/1343 (2006.01)
G02F 1/1335 (2006.01)

(52) U.S. Cl.
CPC .. *G02F 1/134336* (2013.01); *G02F 1/133512* (2013.01); *G02F 1/133514* (2013.01)

(58) Field of Classification Search
CPC ......... G02F 1/134336; G02F 1/133512; G02F 1/133514; G02F 1/134309; G02F 1/1345
See application file for complete search history.

(56) References Cited

U.S. PATENT DOCUMENTS

| 4,867,537 A * | 9/1989 | Aoki ................. G02F 1/133512 349/111 |
| 2003/0202151 A1* | 10/2003 | Hinata ..................... H05K 3/24 349/149 |

(Continued)

FOREIGN PATENT DOCUMENTS

| CN | 103278983 A | 9/2013 |
| CN | 104155792 A | 11/2014 |

(Continued)

OTHER PUBLICATIONS

International Search Report issued in International Application No. PCT/CN2018/105782 dated Jul. 18, 2018, pp. 1-11.

*Primary Examiner* — Sitaramarao S Yechuri
(74) *Attorney, Agent, or Firm* — Leong C. Lei (57) ABSTRACT Provided is a liquid crystal panel. The liquid crystal panel includes a glass substrate, a black matrix and a common electrode which are sequentially stacked. The common electrode completely covers the black matrix. The black matrix comprises a plurality of rows of first shading lines and a plurality of rows of second shading lines. The first shading lines and the second shading lines are perpendicular to and intersect with each other. The glass substrate is further provided with a first signal source located on one side of the black matrix and a plurality of rows of first metal lines disposed on one side facing away from the glass substrate to connect the first signal source and the first metal lines of the common electrode. The first metal lines covering the first (Continued)

shading lines replace common lines located outside the display area of the array substrate.

14 Claims, 6 Drawing Sheets

(56) References Cited

U.S. PATENT DOCUMENTS

| | | | |
|---|---|---|---|
| 2005/0140857 A1* | 6/2005 | Kim | G02F 1/136209 349/110 |
| 2006/0193117 A1* | 8/2006 | Miyata | G02F 1/13452 361/749 |
| 2012/0235948 A1* | 9/2012 | Inoue | G02F 1/13338 345/173 |
| 2016/0334658 A1* | 11/2016 | Jo | G02F 1/13306 |
| 2020/0241354 A1* | 7/2020 | Sun | G02F 1/134309 |

FOREIGN PATENT DOCUMENTS

| | | |
|---|---|---|
| CN | 105511146 A | 4/2016 |
| CN | 205679878 U | 11/2016 |
| CN | 107132685 A | 9/2017 |
| JP | 2015004808 A | 1/2015 |
| KR | 20130034277 A | 4/2013 |

* cited by examiner

LIQUID CRYSTAL PANEL

CROSS REFERENCE

This application is a National Phase of International Application Number PCT/CN2018/105782, filed Sep. 14, 2018, and claims the priority of Chinese Patent Application No. 201810788169.6, entitled "Liquid crystal panel", filed on Jul. 18, 2018, the disclosure of which is incorporated herein by reference in its entirety.

FIELD OF THE INVENTION

The present invention relates to a liquid crystal display device field, and more particularly to a liquid crystal panel of narrow frame.

BACKGROUND OF THE INVENTION

In the current environment of the liquid crystal display industry generally pursuing a narrow frame and a large screen occupation ratio, reducing the frame size of the liquid crystal panel is an important research direction. Although the industry has already controlled the frame size of the array substrate by means of Gate Driver on Array (GOA) driving technology, etc., since the common line area remains around the frame of array substrate, further reduction of the frame of array substrate is limited.

The common line is connected with an external signal source (such as a PCB board, etc.) on the liquid crystal panel and a common electrode for providing a reference potential to the common electrode on the liquid crystal panel. Thus, the current trace of the common line of the liquid crystal display still needs to surround the position around the display area of the array substrate and occupies a large amount of space, thus further reduction of the width of the frame of the liquid crystal panel is limited.

SUMMARY OF THE INVENTION

The present application proposes a circuit optimized liquid crystal panel, which can provide a reliable reference potential for a common electrode while eliminating use of a large number of common lines. The present application includes the following technical solutions:

a liquid crystal panel, comprising a color filter substrate, wherein the color filter substrate comprises a glass substrate, a black matrix and a common electrode which are sequentially stacked, and the common electrode completely covers the black matrix, and the black matrix comprises a plurality of rows of first shading lines extending in a first direction and a plurality of rows of second shading lines extending in a second direction, and the first shading lines and the second shading lines are perpendicular to and intersect with each other, and the glass substrate is further provided with a first signal source located on one side of the black matrix in the first direction, and a plurality of rows of first metal lines are disposed on one side of the black matrix facing away from the glass substrate, and each row of first metal lines at least covers a portion of a row of the first shading line in the first direction, and the plurality of rows of the first metal lines are used to connect the first signal source and the common electrode.

The plurality of rows of the first shading lines and the plurality of rows of the second shading lines enclose a plurality of sub-pixel regions, and the liquid crystal panel further comprises color filters, and the color filters are located in the sub-pixel regions, and each of the color filters completely covers the corresponding sub-pixel region, and the color filters are located between the common electrode and the glass substrate.

A surface of the glass substrate facing the common electrode is a first plane, and in a stacking direction of the common electrode and the glass substrate, a maximum distance of the color filter from the first plane is greater than a maximum distance of the first metal line from the first plane.

In the second direction, a projection of the first metal line on the first shading line is received in the first shading line or aligned with the first shading line.

A number of the first metal lines is equal to a number of the first shading lines, and each row of the first metal lines correspondingly covers a row of the first shading lines.

The first metal line completely covers the first shading line in the first direction.

The liquid crystal panel further comprises an array substrate, wherein the array substrate is provided with a fan-out area on one side in a periphery of a display area facing the first signal source in the first direction, and a projection of the first signal source in the fan-out area is received in the fan-out area.

The black matrix is provided with a second signal source on one side of the first direction away from the first signal source, and a plurality of rows of second metal lines are disposed on one side of the black matrix facing away from the glass substrate, and each row of second metal lines at least covers a portion of a row of the first shading line in the first direction, and the first metal lines and the second metal lines are alternately arranged along the second direction, and the second metal lines are used to connect the second signal source and the common electrode.

The array substrate is also provided with a fan-out area on one side in a periphery of a display area facing the second signal source in the first direction, and a projection of the second signal source in the fan-out area is received in the fan-out area.

A sum of a number of the second metal lines and a number of the first metal lines is equal to a number of the first shading lines.

The liquid crystal panel further comprises a plurality of rows of third metal lines extending along the second direction, wherein each row of the third metal lines at least covers a portion of a row of the second shading line, and each row of the second metal line is at least electrically connected to two rows of the first metal lines, simultaneously.

The glass substrate is further provided with a third signal source located on one side of the black matrix in the second direction, and the plurality of rows of the third metal lines are used to connect the third signal source and the common electrode.

A projection of the third metal line on the second shading line is received in the second shading line or aligned with the second shading line.

A number of the third metal lines is equal to a number of the second shading lines, and each row of the third metal lines correspondingly covers a row of the second shading lines.

The third metal line completely covers the second shading line in the second direction.

In the liquid crystal panel according to the present application, the liquid crystal panel is shaded from light and the potential reference is provided by the color filter substrate in which the glass substrate, the black matrix and the common electrode are sequentially stacked. The potential reference of the common electrode is provided by the first signal source, and conduction of the potential reference is achieved by connecting the common electrode and the first metal line of the first signal source. The first metal line at least covers a portion of a row of the first shading line in the first direction. Namely, the trace of the first metal line is arranged along a path of the first shading line. Since the first metal line connects the first signal source and the common electrode simultaneously, the first metal line may replace a common line previously located around the array substrate of the liquid crystal panel to connect the common electrode and the first signal source to achieve potential balance. Specifically, the first metal lines replace the common line wiring on three sides outside the display area of the array substrate, and the potential reference balance of the common electrode is realized by an electrical connection between the first signal source and the common electrode. After eliminating the common lines on the three sides, the frame width of the array substrate at these three sides can be further reduced to achieve the effect of narrowing frames. It can be understood that the liquid crystal display obtains a prominent narrow frame effect due to being equipped with the liquid crystal panel described in the present application. Furthermore, electronic device equipped with the liquid crystal display also promotes the user experience due to the narrow frame effect.

DETAILED DESCRIPTION OF PREFERRED EMBODIMENTS

The embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained, should all be considered within the scope of protection of the present application.

Figure 1:
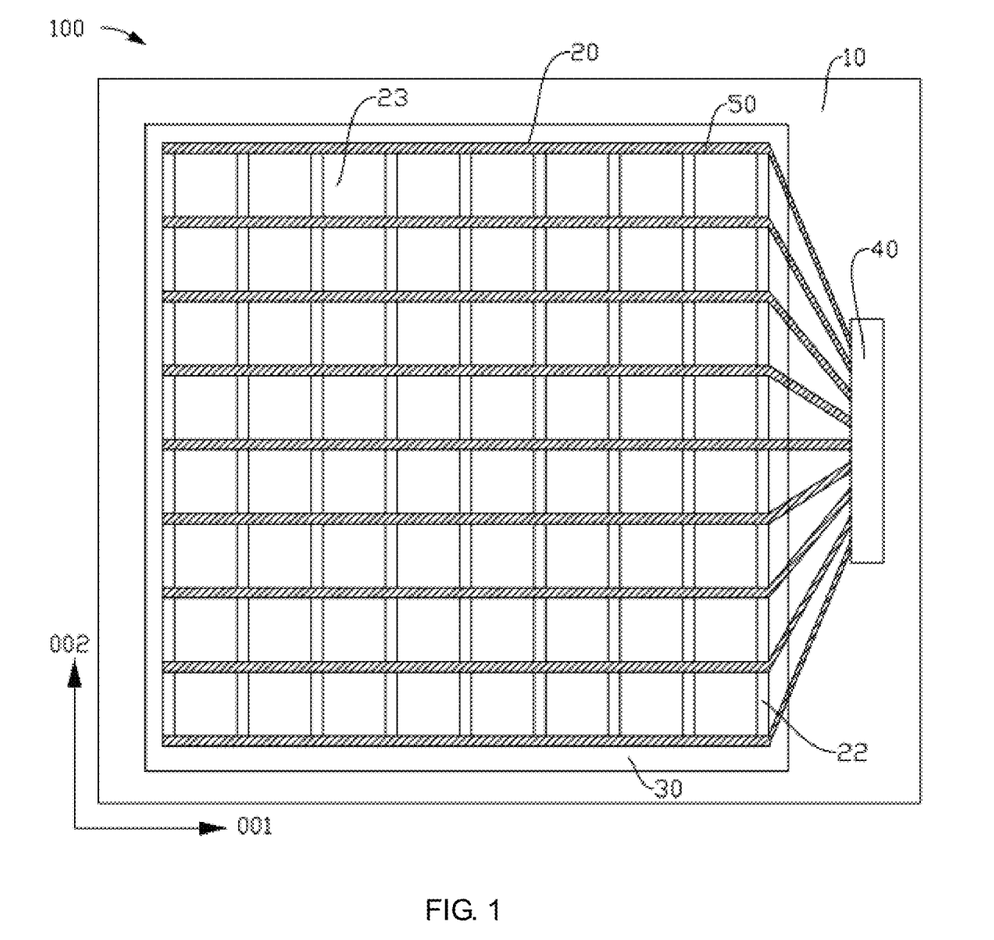
FIG. 1 is a diagram of a color filter substrate of a liquid crystal panel according to the present application.
Figure 2:
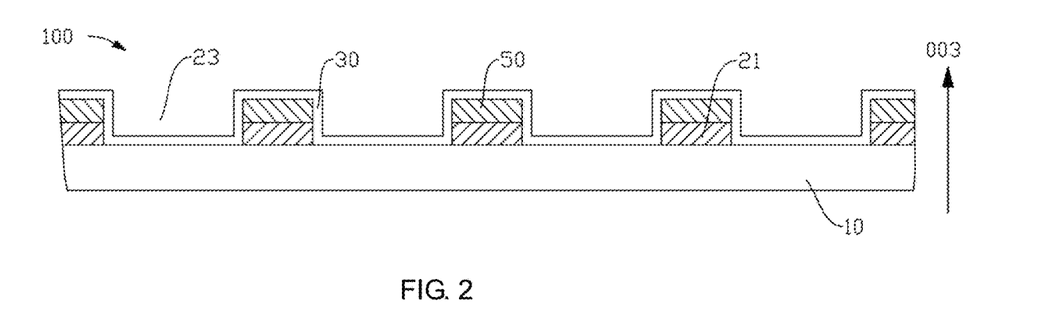
FIG. 2 is a sectional diagram of the color filter substrate of the present application in a state of FIG. 1.
Figure 5:
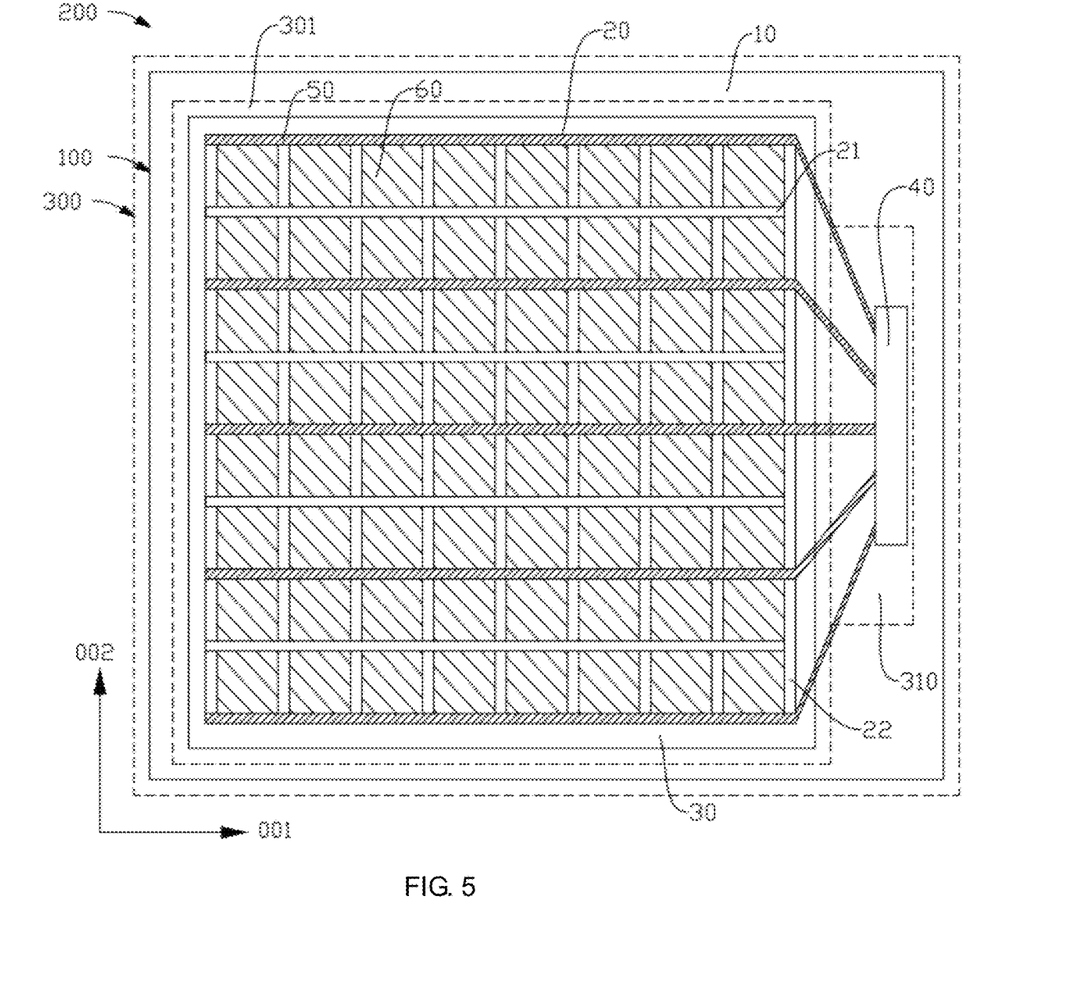
FIG. 5 is a diagram of a liquid crystal panel according to the present application.

Please refer to FIG. 1, FIG. 2 and FIG. 5. The liquid crystal panel 200 includes a color filter substrate 100. The color filter substrate 100 includes a glass substrate 10, a black matrix 20 and a common electrode 30. The glass substrate 10 and the black matrix 20 and the common electrode 30 are sequentially stacked in a direction perpendicular to the glass substrate 10. The black matrix 20 is located between the glass substrate 10 and the common electrode 30. The common electrode 30 serves as a component for providing a reference potential to the outside of the color filter substrate 100, and completely covers the black matrix 20. The black matrix 20 includes a plurality of rows of first shading lines 21 extending in a first direction 001 and a plurality of rows of second shading lines 22 extending in a second direction 002. Specifically, each row of the first shading lines 21 is perpendicular to and intersect with the plurality of rows of the second shading lines 22. Each row of the second shading lines 22 is perpendicular to and intersect with the plurality of rows of the first shading lines 21. The glass substrate 100 is further provided with a first signal source 40 located on one side of the black matrix 20 in the first direction 001. The first signal source 40 extends a plurality of rows of first metal lines 50 to the black matrix 20. The first metal lines 50 are disposed on one side of the black matrix 20 facing away from the glass substrate 10, and at least cover portions of the first shading lines 21 in the first direction 001. Specifically, each row of the first metal lines 50 independently corresponds to a row of the first shading lines 21, and the first metal line 50 cover at least a portion of a length of the corresponding first shading line 21 direction 001.

It can be understood that since the common electrode 30 is made of a conductive material, the first metal line 50 is also made of a conductive material. Besides, the common electrode 30 and the first metal line 50 are both located on one side of the black matrix 20 facing away from the glass substrate 10, and the common electrode 30 and the plurality of rows of the first metal lines 50 are all electrically connected. Thereby, the first metal line 50 can simultaneously connect the first signal source 40 and the common electrode 30. The first signal source 40 provides a reference potential to the color filter substrate 100 when the liquid crystal panel 200 is in operation. The reference potential is conducted to the common electrode 30 through the first metal line 50. Since the first metal lines 50 are arranged in multiple rows, a relatively complete coverage to the common electrode 30 can be achieved. Therefore, the first metal lines 50 can replace the common lines in the existing design, thereby realizing the function of providing the potential reference to the common electrode 30. Furthermore, since the first metal line 50 is located within the black matrix 20 and the black matrix 20 is located within the display area of the liquid crystal panel 200, the first metal line 50 does not occupy the non-display area of the liquid crystal panel 200 as the common lines described above, and thus the non-display area of the liquid crystal panel 200 can be reduced. Specifically, the display area of the liquid crystal panel 200 has a rectangular shape. The first signal source 40 is disposed on one side of the display area of the liquid crystal panel 200 in the first direction 001. The common lines in the prior art are usually located on the array substrate 300 of the liquid crystal panel 200, and the first signal source 40 is also generally located on the array substrate 300, thereby widening the area of the array substrate 300. In the liquid crystal panel 200 of the present application, the common lines originally disposed on the array substrate 300 are replaced by the first signal source 40 and the first metal lines 50 disposed on the color filter substrate 100. Therefore, the arrangement of the common lines on the array substrate 300 is eliminated, thereby reducing the frame width and obtaining a better narrow frame effect.

It can be understood that for the position relationship between the first metal line 50 and the common electrode 30, in the embodiment of FIG. 2, the first metal line 50 is located between the black matrix 20 and the common electrode 30.

When the common electrode 30 provides the reference potential to the outside, the common electrode 30 also serves as an outermost surface of the color filter substrate 100, and provides the reference potential to the outside. In other embodiments, the first metal lines 50 may also be disposed on one side of the common electrode 30 facing away from the glass substrate 10. Namely, the first metal lines 50 and the common electrode 30 together form the outermost surface of the color filter substrate 100, and provide the reference potential to the outside. Because of the operational properties of the common electrode 30, it is only necessary to ensure that the reference potential supplied to the outside is accurately uniform, and the outer surface thereof does not need to be in contact with the outside. Therefore, the first metal lines 50, which are also made of a conductive material and possess the same potential, can also provide the reference potential to the outside together with the common electrode 30 without affecting the normal operation of the liquid crystal panel 200. Specifically, the position relationship between the first metal lines 50 and the common electrode 30 can be flexibly set by specific process conditions.

Specifically, in order to facilitate a clearer description, the first shading lines 21 and the second shading lines 22 in the black matrix 20 are enlarged in each figure of the present application, and the corresponding first metal lines 50 are also enlarged with the same ratio. In the actual product, the actual density of the first shading lines 21 and the second shading lines 22 in the black matrix 20 of the liquid crystal panel 200 is much smaller than the illustration, and the line widths of the first shading lines 21 and the second shading lines 22 are also far smaller than the illustration.

On the other hand, when the first metal lines 50 that the first signal source 40 needs to drive are excessive, in order to reduce the loading, a plurality of the first signal sources 40 may be disposed on the same side of the black matrix 20, and the plurality of the first signal sources 40 are electrically connected to the common electrode 30 through the first metal lines 50, and the plurality of the first signal sources 40 provide the potential reference to the common electrode 30.

Please refer to FIG. 1, the plurality of rows of the first shading lines 21 and the plurality of rows of the second shading lines 22 enclose a plurality of sub-pixel regions 23 on the color filter substrate 100. It can be understood that after the cell process is accomplished with the color filter substrate 100, the sub-pixel regions 23 are configured to transmit colored light while the black matrix 20 is configured to block light passing through the outside of the sub-pixel regions 23. In the COA-based panel, since the color filter is disposed on the array substrate, the sub-pixel regions 23 are only used to transmit the light.

Figure 3:
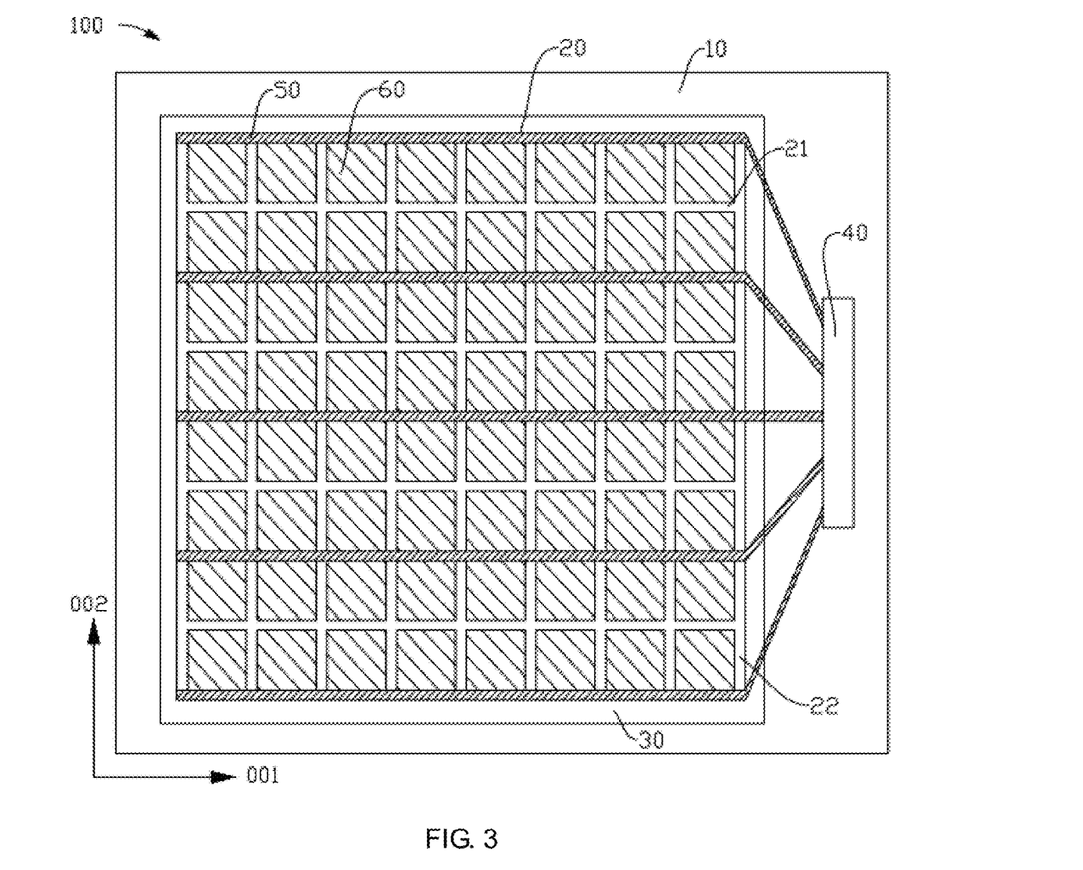
FIG. 3 is a diagram of another embodiment of the color filter substrate of the present application.
Figure 4:
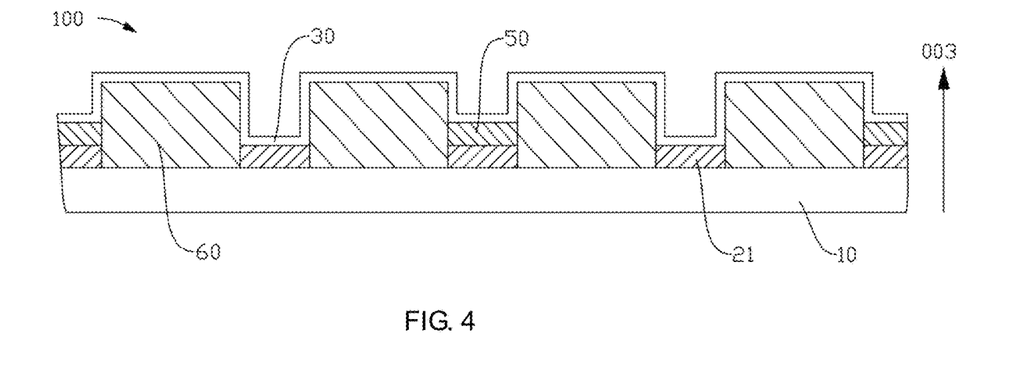
FIG. 4 is a sectional diagram of the color e substrate of the present application in a state of FIG. 3.

In the embodiment of FIG. 3, the color filters 60 are disposed on the color filter substrate 100. Then, the color filters 60 are disposed in the sub-pixel regions 23. Each of the color filters 60 completely covers the corresponding sub-pixel region 23. Alternatively, the color filters 60 are separately disposed on the liquid crystal panel 100. The black matrix 20 is filled in spaces among the color filters 60, and the black matrix 20 is configured to block light, and the light between two adjacent color filters 60 is prevented from passing through the color filter substrate 100. Please refer to FIG. 4. The color filters 60 are located between the common electrode 30 and the glass substrate 10. It can be understood that the color filters 60 may include a "red, green, blue" three-color filters arranged in sequence, or some other color filters such as "red, green, blue, white" arranged in sequence.

Furthermore, a direction in which the glass substrate 10 faces the common electrode 30 is defined as a third direction 003. In the third direction 003, a surface of the glass substrate 10 close to the common electrode 30 is a first plane 11. A height of the color filter 60 in the third direction 003 needs to be greater than a height of the first metal line 50 in the third direction 003. Namely, the most distal dimension of the color filter 60 from the first plane 11 is greater than the most distal dimension of the first metal line 50 from the first plane 11. Thus, this ensures that the color filters 60 are closer to the external device relative to the first metal lines 50. Due to the insulating properties, the color filter 60 is uncharged itself. The color filter can provide a certain protection to the first metal lines 50 when an accidental contact occurs between the color filter substrate 100 and an external device (such as the array substrate 300). When the color filter 60 is scratched or indented by the outside, the first metal line 50 can continue to maintain the shape without being damaged, and the electrical function can be maintained to be normal. At the expense of the partial filtering effect, the electrical balance of the entire color filter substrate 100 can be still maintained.

In one embodiment, for the size of the first metal line 50 in the second direction 002, a projection of the first metal line 50 on the first shading line 21 is received in the first shading line 21 or aligned with the first shading line 21, Namely, the first metal line 50 does not exceed a size range of the first shading line 21 in the second direction 002. Thus, the light-passing area of the sub-pixel region 23 is the area enclosed by the first shading line 21 and the second shading line 22, so as to avoid that the first metal line 50 is beyond the first shading line 21, and shades the light that should pass through the sub-pixel region 23 to lower the overall amount of the light passing through the liquid crystal panel 100 to decrease the overall brightness.

It can be understood that the arrangement of the first metal lines 50 in the second direction 002 has no influence on whether the color filters 60 are located on the liquid crystal panel 100 or not. Namely, this embodiment can be applied to both the color filter substrate 100 including the color filter 60 and the color filter substrate 100 in which the color filter 60 is not configured according to the COA technology.

Specifically, as shown in FIG. 1 and FIG. 3, a number of the first metal lines 50 can be equal to a number of the first shading lines 21 (in FIG. 1), and can be less than the number of the first shading lines 21. When the number of the first metal lines 50 is less than the number of the first shading lines 21, the first metal lines 50 are preferably distributed evenly on the first shading lines 21 along the second direction 002 (in FIG. 3). Certainly, in other embodiments, when the number of the first metal lines 50 is less than the number of the first shading lines 21, the first metal lines 50 may not be evenly distributed on the first shading lines 21. It can be understood that when the number of the first metal lines 50 is equal to the number of the first shading lines 21, i.e. each row of the first metal lines 50 correspondingly covers a row of the first shading lines 21. The first metal line 50 can be in more fully contact with the common electrode 30 to achieve a better balance potential effect.

In one embodiment, the first metal line 50 completely covers the first shading line 21 in the first direction 001. Namely, the first metal line 50 completely penetrates the black matrix 20 along the first direction 001. After such arrangement, the common electrode 30 covering on the black matrix 20 can be connected with the first metal lines 40 in the first direction 001 to better achieve the control of the potential reference of the common electrode 30 by the first metal line 50.

As shown in the embodiment of FIG. 5, the color filter substrate 100 and the array substrate 300 are stacked in the third direction 003. The array substrate 300 is provided with a fan-out area 310 on one side in a periphery of a display area 301 facing the first signal source 40 in the first direction 001. The fan-out area 310 is used to provide scan signals and data signals for the array substrate 300. A projection of the first signal source 40 in the fan-out area 310 is received in the fan-out area 310. Because of the presence of the fan-out area 310, the area of the array substrate 300 is larger than the area of the color filter substrate 100. By configuring the projection of the first signal source 40 to be received in the fan-out area 310, a defect that a total area of the liquid crystal panel 200 is increased because an occupied area of the first signal source 40 is excessively large can be avoided.

Figure 6:
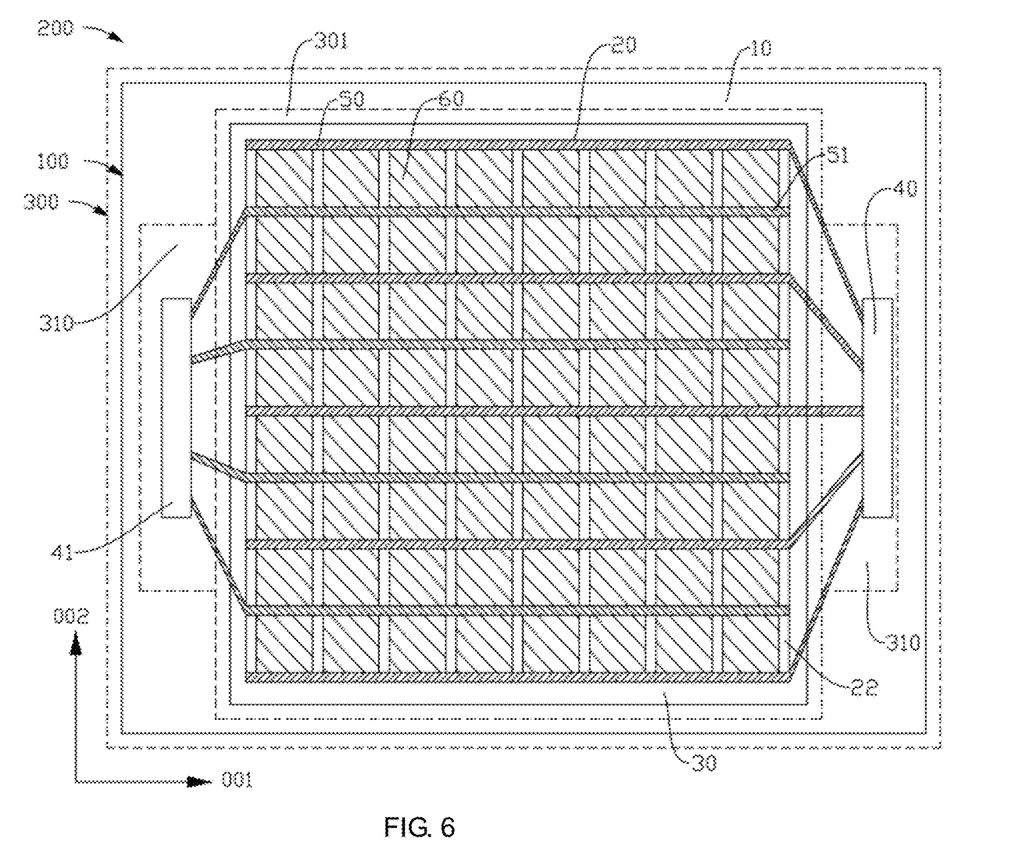
FIG. 6 is a diagram of another embodiment of a liquid crystal panel according to the present application.

As aforementioned, when the first metal lines 50 that the first signal source 40 needs to drive are excessive, in order to reduce the loading, a plurality of the first signal sources 40 may be disposed on the same side of the black matrix 20, Please refer to another embodiment of FIG. 6, the black matrix 20 is provided with a second signal source 41 on one side away from the first signal source 40 in the first direction 001. A plurality of rows of second metal lines 51 is disposed on one side of the black matrix 20 facing away from the glass substrate 10. Each row of second metal lines 51 at least covers a portion of a row of the first shading line 21 in the first direction 001, and the first metal lines 50 and the second metal lines 51 are alternately arranged along the second direction 002, and the second metal lines 51 are used to connect the second signal source 41 and the common electrode 30. Such arrangement can also reduce the driving stress of the single first signal source 40, so that the potential balance of the entire common electrode 30 can be further ensured.

It can be understood that the shape and thickness of the second metal lines 51 are preferably similar to the arrangement of the first metal lines 50. Namely, the width of the second metal line 51 in the second direction 002 does not exceed the first shading line 21, and a distance of the second metal line 51 in the third direction 003 from the first plane 11 is preferably smaller than a distance of the color filter 60 from the first plane 11. Meanwhile, for covering the common electrode 30 as possible, a sum of the number of the second metal lines 51 and the number of the first metal lines 50 is preferably equal to the number of the first shading lines 21. Furthermore, in case that the array substrate 300 is also provided with a fan-out area 310 on one side of the display area 301 adjacent to the second signal source 41, a projection of the second signal source 41 on the array substrate 300 is also preferably received in the fan-out area 310.

Figure 7:
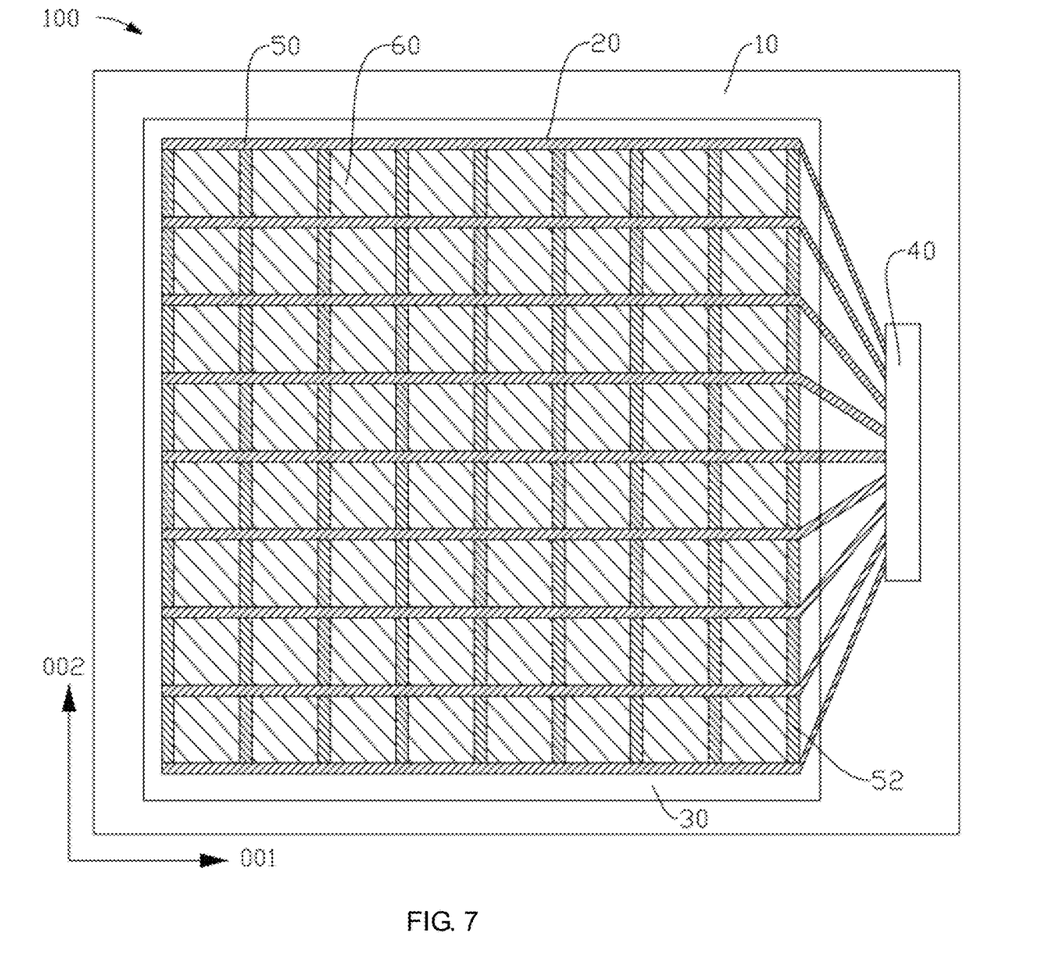
FIG. 7 is a diagram of one another embodiment of a color filter substrate according to the present application.

Please refer to embodiment of FIG. 7, the color filter substrate 100 further includes a plurality of rows of third metal lines 52. The plurality of rows of third metal lines 52 extend along the second direction 002, and each row of the third metal lines 52 at least covers a portion of a row of the second shading line 22 in the second direction 002. Furthermore, each row of the second metal line 52 is at least electrically connected to two rows of the first metal lines 50, simultaneously. Alternatively, each row of the third metal lines 52 conducts a row of the first metal lines 50 and a row of the second metal lines 51. As shown in the embodiment of FIG. 7, the plurality of rows of first metal lines 50 extend independently from one another in the first direction 001 to perform potential balance function on the common electrode 30 adjacent to the connection region after being connected with the common electrode 30. Since the respective rows of first metal lines 50 are different in process, material and stroke distance, there may be slight differences in current transmitting rate. Therefore, at the position in the first direction 001 away from the first signal source 40, a large potential difference may be formed between the rows of the first metal lines 50, and eventually, the potential reference on one side of the color film substrate 100 away from the first signal source 40 possesses a relatively more nonuniform phenomenon. After the third metal lines 52 are introduced, the third metal lines 52 may connect the plurality of rows of first metal lines 50 in series in the second direction 002. Each row of the first metal lines 50 can be electrically balanced under the series connection of the third metal lines 52. The neutralization due to nonuniform potential due to the different current transmitting rates is achieved. Namely, the third metal lines 52 can balance the potential difference among the first metal lines 50, which contributes to a more accurate potential reference of the common electrode 30. Certainly, in the embodiment in which the color film substrate 100 is further provided with the second metal lines 51, the third metal lines 52 may also balance the potential difference between the first metal lines 50 and the second metal lines 51.

It can be understood that the third metal line 52 is preferably disposed to across the first metal line 50 as possible. Similar to the embodiment of FIG. 7, the third metal lines 52 completely cover each row of the first metal lines 50 in the second direction 002. Furthermore, similar to the arrangement of the first metal lines 50, the size of the third metal line 52 in the first direction 001 is received in the second shading line 22 or aligned with the second shading line 22; a distance of the third metal line 52 in the third direction 003 from the first plane 11 is preferably smaller than a distance of the color filter 60 from the first plane 11; a number of the third metal lines 52 is preferably equal to a number of the second shading lines 22, and the effect thereof is also similar to the effect of the first metal lines 50.

Figure 8:
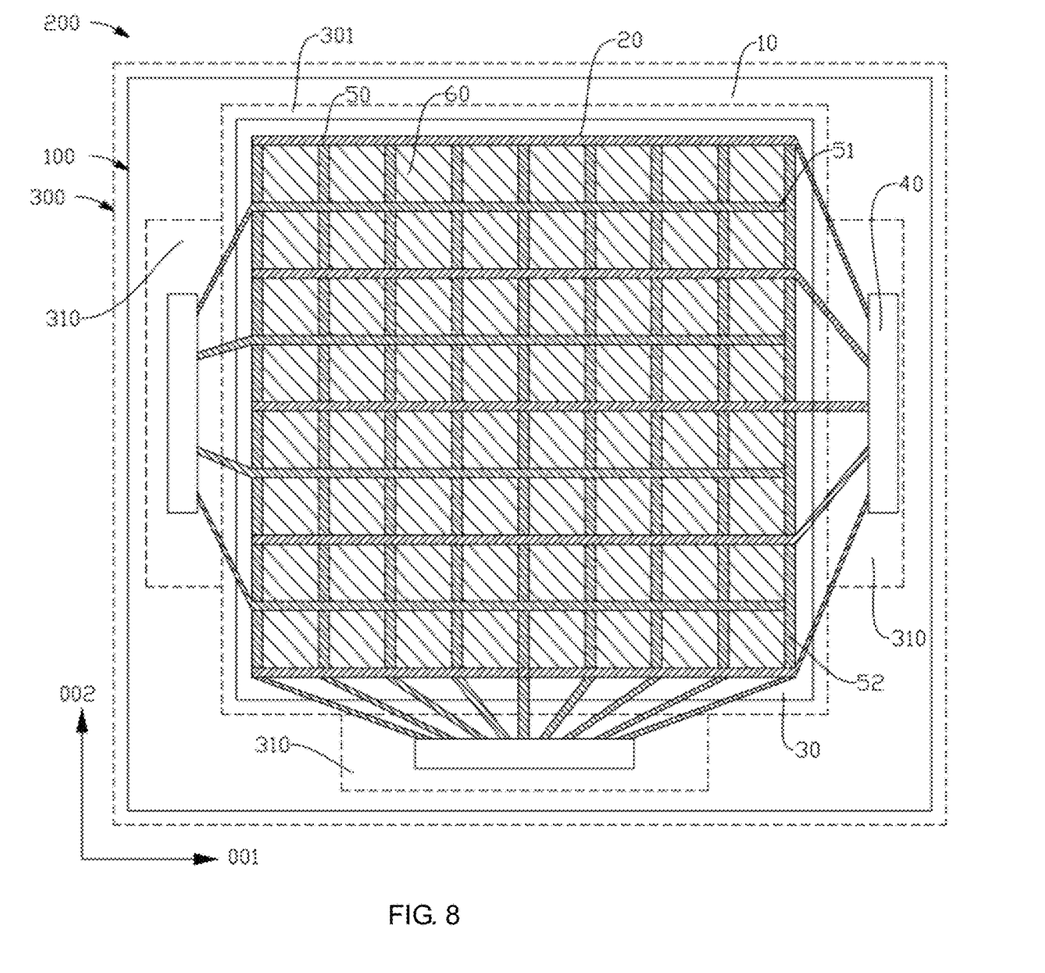
FIG. 8 is a diagram of one another embodiment of a liquid crystal panel according to the present application.

Furthermore, as shown in FIG. 8, the color filter substrate 100 is provided with a third signal source 42 on one side of the black matrix 20 in the second direction 002. Thereby, the plurality of rows of third metal lines 52 are used to connect the third signal source 42 and the common electrode 30. The cooperation of the third signal source 42 with the first signal source 40, or the cooperation of the third signal source 42 with the second signal source 41 and the first signal source 40 can further ensure the potential balance on the common electrode 30. Furthermore, in case that the array substrate 300 is also provided with a fan-out area 310 on one side of the display area 301 adjacent to the third signal source 42, a projection of the third signal source 42 on the array substrate 300 is also preferably received in the fan-out area 310.

It can be understood that when the liquid crystal panel 200 of the present application is equipped in the liquid crystal display, the frame of the liquid crystal display can be further narrowed, the effect of the narrow frame is realized, and the user experience is improved. The electronic device also improves the quality of the product because of the effect of the narrow frame after being equipped with the liquid crystal display including the liquid crystal panel 200 of the present application.

The foregoing electronic device may be any device having communication and storage functions, such as a smart device with network capabilities, illustrated as a tablet computer, a mobile phone, an e-reader, a remote controller, a personal computer (PC), a notebook computer, an in-vehicle device, a network television, a wearable device, etc.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal panel, comprising a color filter substrate, wherein the color filter substrate comprises a glass substrate, a black matrix and a common electrode which are sequentially stacked, and the common electrode completely covers the black matrix, and the black matrix comprises a plurality of rows of first shading lines extending in a first direction and a plurality of rows of second shading lines extending in a second direction, and the first shading lines and the second shading lines are perpendicular to and intersect with each other, and the glass substrate is further provided with a first signal source located on one side of the black matrix in the first direction, and a plurality of rows of first metal lines are disposed on one side of the black matrix facing away from the glass substrate, and each row of first metal lines at least covers a portion of a row of the first shading line in the first direction, and the plurality of rows of the first metal lines are used to connect the first signal source and the common electrode; wherein the plurality of rows of the first shading lines and the plurality of rows of the second shading lines enclose a plurality of sub-pixel regions, and the liquid crystal panel further comprises color filters, and the color filters are located in the sub-pixel regions, and each of the color filters completely covers the corresponding sub-pixel region, and the color filters are located between the common electrode and the glass substrate; and, wherein a surface of the glass substrate facing the common electrode is a first plane, and in a stacking direction of the common electrode and the glass substrate, a maximum distance of the color filter from the first plane is greater than a maximum distance of the first metal line from the first plane.

2. The liquid crystal panel according to claim 1, wherein in the second direction, a projection of the first metal line on the first shading line is received in the first shading line or aligned with the first shading line.

3. The liquid crystal panel according to claim 1, wherein a number of the first metal lines is equal to a number of the first shading lines, and each row of the first metal lines correspondingly covers a row of the first shading lines.

4. The liquid crystal panel according to claim 1, wherein a number of the first metal lines is less than a number of the first shading lines.

5. The liquid crystal panel according to claim 1, wherein the first metal line completely covers the first shading line in the first direction.

6. The liquid crystal panel according to claim 5, further comprising an array substrate, wherein the array substrate is provided with a fan-out area on one side in a periphery of a display area facing the first signal source in the first direction, and a projection of the first signal source in the fan-out area is received in the fan-out area.

7. The liquid crystal panel according to claim 1, wherein the black matrix is provided with a second signal source on one side of the first direction away from the first signal source, and a plurality of rows of second metal lines are disposed on one side of the black matrix facing away from the glass substrate, and each row of second metal lines at least covers a portion of a row of the first shading line in the first direction, and the first metal lines and the second metal lines are alternately arranged along the second direction, and the second metal lines are used to connect the second signal source and the common electrode.

8. The liquid crystal panel according to claim 7, wherein in the second direction, a projection of the second metal line on the first shading line is received in the first shading line or aligned with the first shading line.

9. The liquid crystal panel according to claim 7, wherein a sum of a number of the second metal lines and a number of the first metal lines is equal to a number of the first shading lines.

10. The liquid crystal panel according to claim 7, further comprising a plurality of rows of third metal lines extending along the second direction, wherein each row of the third metal lines at least covers a portion of a row of the second shading line, and each row of the third metal lines conducts a row of the first metal lines and a row of the second metal lines.

11. The liquid crystal panel according to claim 1, further comprising a plurality of rows of third metal lines extending along the second direction, wherein each row of the third metal lines at least covers a portion of a row of the second shading line, and each row of the second metal line is at least electrically connected to two rows of the first metal lines, simultaneously.

12. The liquid crystal panel according to claim 11, wherein the third metal lines completely cover all of the first metal lines in the second direction.

13. The liquid crystal panel according to claim 1, wherein the glass substrate is further provided with a third signal source located on one side of the black matrix in the second direction, and the plurality of rows of the third metal lines are used to connect the third signal source and the common electrode.

14. The liquid crystal panel according to claim 1, wherein a number of the first signal sources is plural, and the plurality of first signal sources are electrically connected to the common electrode through the first metal lines.

* * * * *